Aug. 15, 1944.   G. H. JOHNSON   2,355,869
TRANSMISSION AND CONTROL MECHANISM
Filed Oct. 19, 1939   4 Sheets-Sheet 1

INVENTOR
GEORGE H. JOHNSON
BY
Fred G. Parsons
ATTORNEY

Patented Aug. 15, 1944

2,355,869

UNITED STATES PATENT OFFICE 2,355,869

TRANSMISSION AND CONTROL MECHANISM

George H. Johnson, Madison, Wis., assignor to Gisholt Machine Company, Madison, Wis., a corporation of Wisconsin Application October 19, 1939, Serial No. 300,139

29 Claims. (Cl. 74—338)

This invention relates to transmission and control mechanism, particularly for machine tools, and especially for the spindle drive of lathes.

An object of the invention is to minimize the time, effort and attention required for the operator to effect the rate changes required in operation of a machine tool, particularly for change of rate as required between steps of successive operations for machining a work piece.

Another object is to effect a transmission and control organization selectively operable in different ways according to the nature of the operation or work piece whereby to operate the machine in each instance with maximum production and a minimum of operator's time, effort and attention, and particularly for lathes.

A further object is to provide improved control selective mechanism in a machine having several selectively available methods of control, and particularly to provide such mechanism organized for convenience and in such manner that the mechanism effecting one method of control does not set up undesired limitations on other available control methods.

A further object is to provide a rate change transmission and control organization adapted for rate changers providing for high output speeds, and particularly where the high speeds are included as a part of a range of output speeds also providing relatively low speeds.

A further purpose is generally to simplify and improve the construction, operation and structural relationship in a machine tool of rate change transmission and control mechanism, particularly in the matters previously mentioned, and especially for lathes or similar machines; and still other objects of the invention will be apparent from this specification.

The invention resides in the construction and arrangement of parts as herein illustrated, described and claimed, but it will be understood that various modifications of the illustrated structure are contemplated, and that the invention includes all such modifications which are equivalent to or within the scope of the claims.

The same reference characters have been used to identify the same parts throughout, and in the drawings.

Figures 1, 2:
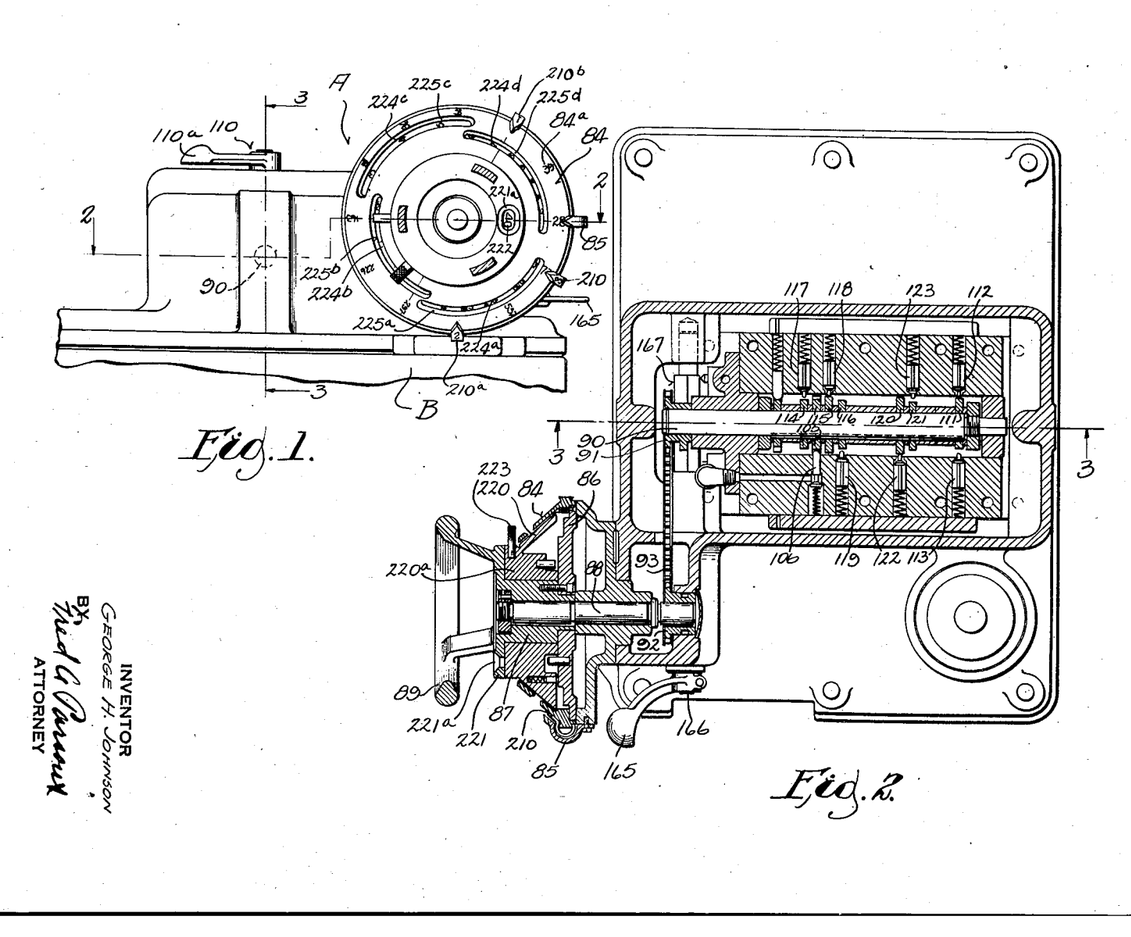
Figure 1 is a partial front elevation of a lathe in which the invention is incorporated, the portion shown being a speed controller device mounted on the upper part of the headstock or spindle end of the lathe, a portion of the speed controller device being broken away to more clearly show certain selector dials.
Figure 2 is a horizontal sectional view of the speed controller shown in Fig. 1, the section being taken approximately along line 2—2 of Fig. 1.
Figures 3, 5:
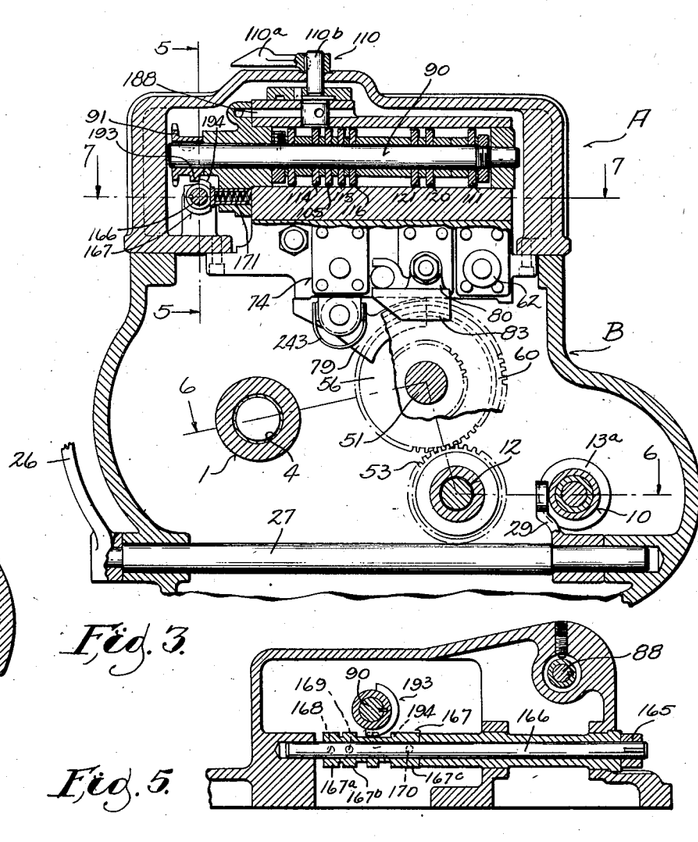
Figure 3 is a partial vertical transverse section taken approximately along line 3—3 of Fig. 1, and 3—3 of Fig. 2, and showing the relationship of the speed controller to a spindle transmission of the lathe.
Figure 5 is a transverse vertical section taken approximately along lines 5—5 of Fig. 3.

The lathe here shown comprises a control unit A, Figs. 1, 3, and a support including a bed, not shown, and the headstock of which a portion B is shown, the control unit A being removably fixed with the headstock. Carried by the supporting structure there is a spindle transmission, best shown in Fig. 6, comprising shiftable reverser-interruptor clutches, and various rate change units serially arranged and shiftable to a variety of position combinations collectively effecting the desired range of spindle speeds. The control unit A forms a closure for the otherwise upwardly open headstock, and operating engagement of the unit with the controlled parts takes place as the disassembled unit is moved downwardly to its position shown in Fig. 1.

It will be understood that the lathe referred to includes the bed with which the headstock is B fixed, also suitable carriages or tool supports slidably carried on the bed for supporting and guiding tools in both cross and longitudinal movement relative to the work spindle together with suitable transmission and control mechanism therefor; but since lathes of such type are well known in various forms, and the novel features of the present invention are particularly in the spindle drive and controls herein shown and described, such supplemental structure is not here shown.

Figure 6:
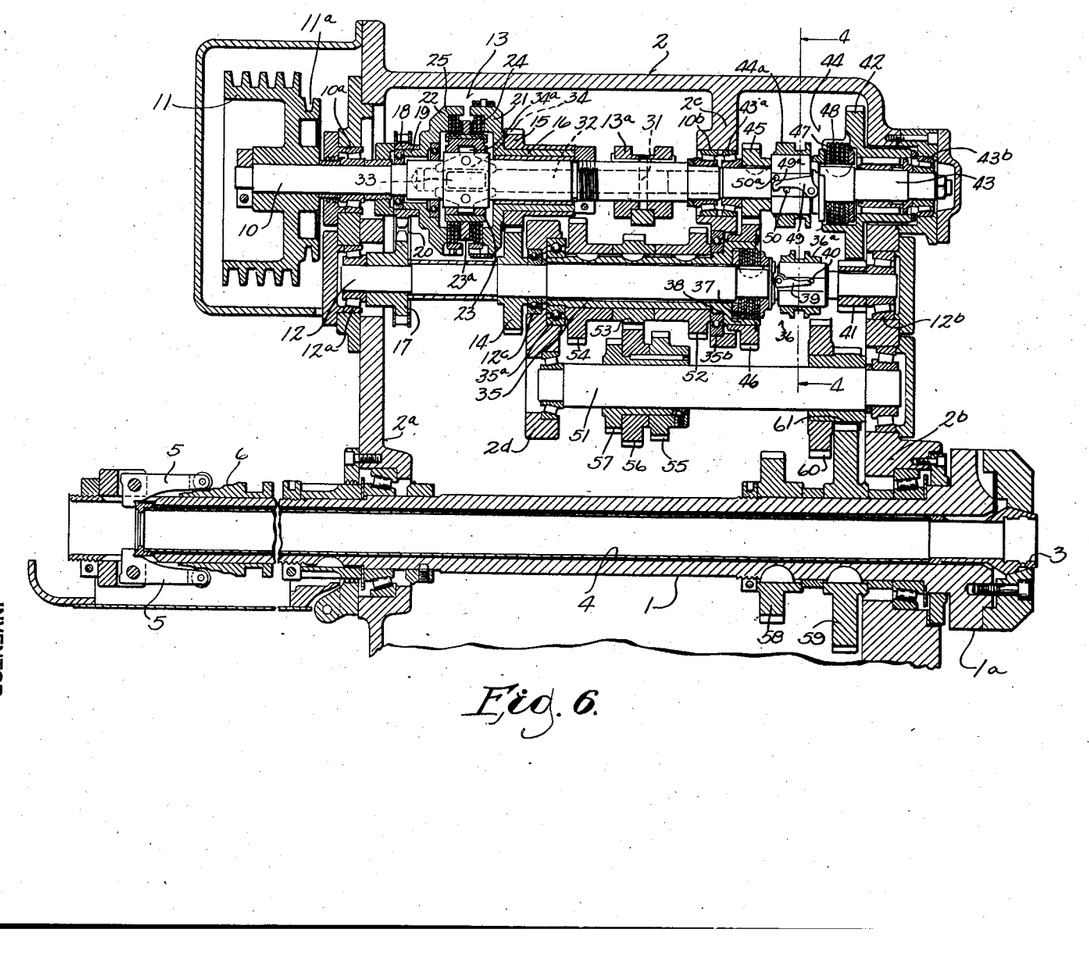
Figure 6 is a sectional development of a spindle transmission, and certain associated parts, of the lathe shown in Fig. 1, the development being taken along line 6—6 of Fig. 3.

Referring to Fig. 6 a lathe spindle 1 is suitably rotatably mounted in end walls 2a, 2b of a headstock hollow frame or housing 2, a portion 1a of the spindle projecting from the headstock in the direction of the tool carriage, not shown. At its projecting end spindle 1 carries a spring collet 3 which may be contracted for gripping a stock bar or work piece, not shown, by means such as a push tube 4, pivoted levers 5, 5 and an operating spool 6 provided with operating means, not shown, in the usual manner. Spindle 1 may be driven at various speeds in either direction by the means of transmission mechanism as follows:

A primary drive shaft 10, Figs. 3, 6, is rotatably mounted in suitable bearings 10a, 10b respectively carried by the end wall 2a and by an interior rib or wall 2c. Fixed on shaft 10 there is a driving pulley 11, which may be driven from any suitable power source, such as an electric motor, not shown. A second shaft 12 is parallel to shaft 10 and mounted in suitable end bearings 12a, 12b respectively carried by the end walls 2a, 2b, there being also an intermediate bearing 12c carried by an interior rib or wall 2d. Shaft 10 may drive shaft 12 through a reverser-interrupter device 13, operable to effect alternative forward, reverse or stop of shaft 12 while shaft 10 is continuously uni-directionally driven from pulley 11.

The reverser-interrupter device 13, Fig. 6, is shiftable by a clutch spool 13a, and includes a pair of meshed gears 14, 15 respectively fixed on shaft 12 and on a sleeve 16 which is rotatably supported on shaft 10; also a pair of sprockets 17, 18 respectively fixed on shaft 12 and on a sleeve 19 which is rotatably supported on shaft 10, the sprockets being connected by a chain 20. Fixed respectively with the sleeves 16, 19 are outer clutch members 21, 22, and slidably keyed on the shaft 10 there is an inner shiftable clutch member 23 which carries an intermediate annular abutment 23a. Two groups of clutch friction plates 24, 25 are respectively associated with the outer clutch members 21, 22, each group having its alternate plates slidably keyed with the associated outer clutch member and with the inner clutch member 23. A manually operable clutch lever 26, Fig. 3, fixed on a shaft 27, shifts the clutch spool 13a, Figs. 3, 6, by the means of a lever 29 engaging a suitable annular groove in the spool, the spool being connected to shift the inner clutch member 23 by the means of a pin 31, a rod 32, a cam member 33, and pivoted toggle levers such as 34 which have a lever portion such as 34a engaging a suitable inner annular groove in the inner clutch member 23. When the hand lever 26 is shifted in the one or the other direction from its central position the inner clutch member 23 is correspondingly shifted, thereby effecting pressure engagement of the one or the other of the friction plate groups 24, 25 to drive shaft 12 from shaft 10 in the one direction through gears 14, 15 or in the other direction through sprockets 17, 18 and chain 20. In the intermediate position of hand lever 26 both the friction plate groups are disengaged, and the drive from shaft 10 is interrupted.

A sleeve 35, Fig. 6, is coaxial with shaft 12, but independently journaled in bearings 35a, 35b. Sleeve 35 may be selectively driven from shaft 12, either at high speed or alternatively at a relatively low speed, through mechanism as follows: For effecting the high speed of sleeve 35 there is provided clutch mechanism collectively indicated by the numeral 36, shiftable by a clutch spool 36a. Clutch 36 includes a set of friction plates 37 of which the alternate plates are slidably keyed respectively with an outer clutch member 38 fixed with sleeve 35, and with shaft 12. The clutch plates 37 may be alternatively released or forced into pressure engagement by the means of a pivoted lever 39 operated to released or engaged positions accordingly as the clutch shifter spool 36a is axially shifted in the one or the other direction, the spool carrying an operating pin 40 which engages a cam end 39a of the lever. When clutch 39 is engaged the gear sleeve 35 is driven at high speed directly from shaft 12.

For effecting the relatively low speed of gear sleeve 35, Fig. 6, there is provided a reduction train including a meshed pair of gears 41, 42 respectively fixed on shaft 12 and rotatably mounted on a shaft 43, the shaft 43 being coaxial with shaft 10 but independently rotatable on bearings 43a, 43b. The reduction train also includes a clutch mechanism collectively indicated by the numeral 44, shiftable by a clutch spool 44a, and a pair of meshed gears 45, 46 respectively fixed on shaft 43 and on the outer clutch member 38 for rotation with sleeve 35. Clutch 44 includes a set of friction plates 47 of which the alternate plates are slidably keyed with shaft 43 and with an outer clutch member 48 which is fixed with the gear 42. The clutch plates 47 may be alternatively released or forced into pressure engagement by the means of a pivoted lever 49 operated to released or engaged position accordingly as the clutch shifter spool 44a is axially shifted in the one or the other direction, the spool carrying operating pins 50, 50a which operate on a cam end 49a of the lever. When clutch 44 is engaged, and the clutch 36 is disengaged, the gear sleeve 35 is driven at relatively slow speed from shaft 12 through the back gear train.

The shifter spools of clutches 36 and 44 are connected together to effect disengagement of clutch 36 simultaneously with engagement of clutch 44, and vice versa, as is later explained.

A rotatable shaft 51, Fig. 6, may be selectively driven from the gear sleeve 35 at any of three different speeds, there being gears 52, 53, 54 fixed on the sleeve and engageable one at a time respectively with gears 55, 56, 57 which are fixed together and unitarily slidably keyed on the shaft 51, the gear unit being shiftable to effect such alternative engagement by mechanism later described.

The spindle 1 may be selectively driven from shaft 51 at either of two different speeds, there being gears 58, 59 fixed on the spindle and engageable one at a time respectively with gears 60, 61 which are fixed together and unitarily slidably keyed on shaft 51, the unit being shiftable to effect the alternative engagement by mechanism later described.

The transmission mechanism described, in its various rate change unit position combinations, effects twelve speeds in either direction in a series forming a substantially geometrical progression, and the arrangement is such that the shifting of the primary rate change unit, consisting of the friction clutches 36, 44, determines whether the shiftable-gear rate change units driven therethrough shall be driven at relatively slow speed, to effect the six lower terms of the geometrical series, or at a high speed to effect the six higher terms of the series. To state the matter in another way, the arrangement is such that operation of the clutch 36, 44, of the primary rate change unit alternatively conditions the rate change units driven therethrough to effect a low or a high series of speeds collectively resulting in the extended geometrical series of speeds which comprise the full range of the rate changer.

Figure 4:
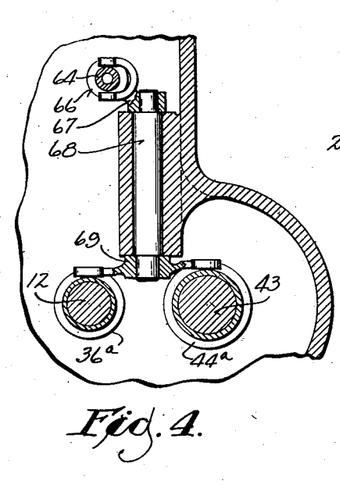
Figure 4 is a partial transverse vertical section, similar to Fig. 3, but, taken at a plane to the right of line 3—3, Fig. 1, approximately as indicated by line 4—4 of Fig. 6.
Figures 7, 7A:
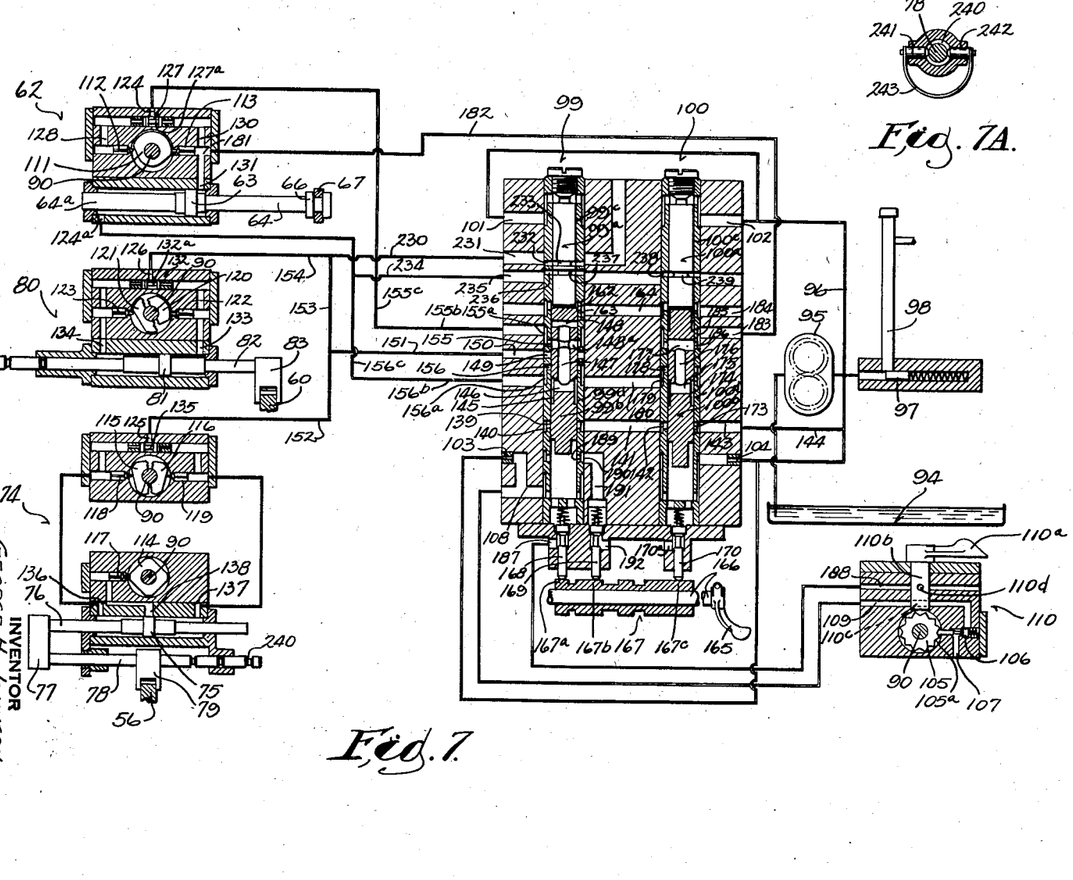
Figure 7 is primarily a somewhat enlarged horizontal section through certain control valves and associated parts, approximately along line 7—7 of Fig. 3, and also shows the inter-connection of the valves with other elements of the control mechanism, most of the other elements being shown diagrammatically and in reduced scale.
Figure 7A is a vertical section of detent mechanism for certain control rods.

Power operable means are connected for the shifting of the various rate change units as follows:

For the shifting of clutches 36, 44, Fig. 6, of the primary rate change unit there is provided a piston device generally denoted by the numeral 62, Figs. 3, 7, which includes a piston 63, a double end piston rod 64 having the one end 64a of diameter larger than the other end, and a shifter spool 66, the spool engaging a lever 67, Fig. 4, fixed on a shaft 68, upon which is also fixed a double end lever 69, the opposite ends of the lever respectively engaging the clutch spools 38a, 44a, Figs. 4, 6. The movement of piston 63 in one direction effects disengagement of clutch 36 simultaneously with engagement of clutch 44, and vice versa, whereby to alternatively effect the previously mentioned slow or fast drive of the remainder of the rate change train.

For the shifting of the gear unit 55, 56, 57, Fig. 6, which constitutes the second rate change unit, there is provided a piston device generally denoted by the numeral 74, Figs. 3, 7, which includes a piston 75, a piston rod 76, a coupler bar 77, a guide rod 78 and a fork 79, the fork ends engaging on opposite sides of the gear 56 of the gear unit.

For the shifting of the gear unit 60, 61, Fig. 6, which constitutes the third rate change unit, there is provided a piston device generally denoted by the numeral 80, Figs. 3, 7, which includes a piston 81, a piston rod 82 and a fork 83, the fork ends engaging on opposite sides of the gear 60.

Primary speed selector means is provided which includes a rotatable speed chart member 84, Figs. 1, 2, carrying adjacent its periphery a chart comprising a series of markings such as 84a, respectively corresponding to the numerical value of the different rotative speeds of the spindle 1 obtainable from the described transmission. Fixed with the frame or housing there is a stationary indicator pointer 85 indicating the various speed positions of the selector chart. The member 84 is fixed on a hub 86 which in turn is fixed on a sleeve 87 keyed with a shaft 88 which may be rotated, together with the chart 84 by the means of a hand wheel 89, the shaft 88 being connected for rotation of a selector cam shaft 90 by the means of sprockets 91, 92 and a chain 93. Shaft 90 has fixed for rotation therewith certain cam elements, later described, primarily controlling the positions of shifter piston devices 62, 74, 80, and thereby controlling the rotational speeds of spindle 1.

Means are provided for various alternative modes of spindle speed control, as will presently be described, but for illustration of the function and operation of the primary control from the selector chart and indicator just referred to there will first be described what may be termed the direct control means whereby, as the chart 84a, Fig. 1, is turned to bring one or another of the markings thereof to coincide with the pointers 85, the control mechanism automatically substantially immediately effects the indicated speed.

A reservoir 94, Fig. 7, supplies liquid, in this instance oil, to a pump such as 95 which is continuously driven, as by a pulley 11a, Fig. 6, wherever the shaft 10 is driven. The reservoir 94 is formed as a bottom closure for the hollow headstock B, Figs. 1, 3, whereby to receive waste or surplus oil from the transmission and control mechanism within the headstock. Lubrication for the transmission may be provided either by dipping the lower gears of the transmission train directly into the oil contained in reservoir 94, or by spraying the excess above that required for the controls over the gears and shafts, or in any suitable well known manner.

Pump 95, Fig. 7, supplies oil to a channel or conduit 96, wherein the liquid is maintained at substantially constant pressure by a spring pressed relief plunger 97, surplus oil passing into a header 98 from which it may be drawn by suitable openings or channels, not shown, for either direct or spray lubrication, etc., as mentioned, of the transmission within the headstock A, or other desired purpose.

Associated with the selector cam shaft 90, Figs. 3, 7, there are a plurality of control valve units respectively generally denoted by the numerals 99, 100. Valve unit 99 includes valve plunger or piston members 99a, 99b reciprocable within coaxial valve sleeves 99c, 99d. Valve unit 100 similarly includes valve plunger or piston members 100a, 110b reciprocable within coaxial valve sleeves 100c, 100d. The upper ends, Fig. 7, of both valve members 99a, 100a act as pistons and are continuously urged downwardly together with valve members 99b, 100b by fluid pressure from channel 96, the valve units receiving fluid respectively from ports such as 101, 102. The lower ends, Fig. 7, of both valve members 99b, 100b are continuously urged upwardly, together with valve members 99a, 100a, by fluid pressure from the channel 96, receiving fluid respectively from restricted area ports such as 103, 104.

The piston area of the valve members 99a, 100a being, as shown, somewhat smaller than that of the valve members 99b, 100b, the piston action will normally force the valve members of both valve units 99, 100 to their uppermost positions, Fig. 7, but certain control means, later described, is provided to selectively relieve the pressure on the lower end, Fig. 7, of either of the valve elements 99b, 100b, whereupon the relieved valve elements will immediately move downwardly.

For purposes of speed control of the direct type now being considered, in which the relative movement of the chart 84a and indicator 85 substantially immediately results in a change to the newly indicated speed, only the elements of the valve unit 99 are moved downwardly, Fig. 7, and such movement is, in this instance, effected as follows:

Fixed on the selector cam shaft 90, Figs. 3, 7, there is a cam 105 providing notches such as 105a respectively corresponding in position to the different speed positions of the speed chart 84a relative to the indicator 85. A spring pressed poppet valve 106 has an end portion cooperating with cam 105 to permit the valve to seat whenever the chart and indicator come to rest in any speed position, but upon relative movement of the chart and indicator the high cam portions between the notches 105a opens the poppet valve to permit fluid to pass through the valve and out through a drain port 107.

The poppet valve 106 is connectible to drain the fluid pressure from the lower end of valve unit 99 through a port 108 and a channel 109. A valve 110, Figs. 1, 7, has a hand lever 110a, and a member 110b providing ports or passages 110c, 110d, the valve member having alternative positions respectively opening and closing the channel 109, for reasons later explained. For the direct mode of rate changer operation now considered the valve 110 is in the position shown in Fig. 7 in which channel 109 is open through the valve port 110c and, in such valve position, any relative movement of the speed selector chart and indicator, whereby to open poppet valve 106, as described, will drain the fluid from the lower end of valve plunger 99b and the valve elements 99a, 99b will immediately move downwardly, Fig. 7, to the full extent of their downward movement. It will be noted that by reason of the restriction of port 103 this action occurs despite the fact that fluid is still being delivered through port 103, the port opening 103 being sufficiently small that the fluid is drained through the poppet valve 106 faster than it can enter through the restricted port 103.

The relative movement of chart 84a and indicator 85 which rotates selector cam shaft 90 and results in downward movement of plunger valves of valve unit 99, as just described, also positions various cams on the shaft 90 which operate poppet valves for controlling the piston devices 62, 74, 80, Fig. 7, as follows:

For the piston device 62 there is provided a control cam 111, Figs. 2, 3, 7, fixed on shaft 90 and operatively determinative of the alternative open or closed position of poppet valves such as 112, 113. For the piston device 74 there are provided three control cams 114, 115, 116 respectively controlling the positions of poppet valves 117, 118, 119. For the piston device 80 there are provided two control cams 120, 121 respectively controlling the position of poppet valves 122, 123.

The arrangement of control cams and poppet valves, just described, is such that in each speed position of the selector chart 84a and indicator 85 one of the poppet valves of each of the piston devices will be open while the other poppet valves are closed. Pressure fluid may be supplied to the piston devices, Fig. 7, through ports 124, 124a for piston device 62, through a port 125 for piston device 74 and through a port 126 for piston device 80.

Referring to the piston device 62, Fig. 7, which shifts the clutches 36, 44, Fig. 6, of the primary rate change unit alternatively to high or low speed position, pressure fluid from port 124a acts directly on the left end of the piston, which is of relatively smaller effective area, by reason of the relatively larger piston rod 64a, at the end of the piston. Pressure fluid from the other port 124 passes through a floating valve 127 having a floating plunger 127a. The one outlet of floating valve 127 communicates with poppet valve 112 through a passage 128. The other outlet of valve 127 communicates through a passage 130 with the poppet valve 113 and with a port 131 leading to the right-hand end of the piston 63. When poppet valve 112 is closed and poppet valve 113 is opened by cam 111, as shown in Fig. 7, the floating plunger 127a moves in the direction of the open poppet valve to close off the flow of pressure fluid to the right end of piston 63 and at the same time this end of the piston is vented through the open poppet valve, whereby pressure from port 124a forces the piston to the right-hand position shown in Fig. 7, which effects slow speed position of the clutches 36, 44. When poppet valve 112 is opened by cam 111 the poppet valve 113 is simultaneously closed and under such conditions the floating plunger 127a moves in the direction to close off leakage through the open poppet valve while maintaining the pressure fluid from port 124 applied to the right end piston face. Under such conditions piston 63 moves to the left of the piston shown in Fig. 7, whereby to effect the high speed position of the clutches 36, 44, since, although pressure is operating on both piston faces, the right face has the larger effective area, as previously stated.

Referring to piston device 80, Fig. 7, which shifts the gear unit 60, 61, Fig. 6 to its alternative speed position, pressure fluid delivered to the port 126 passes through a floating valve 132 having a floating plunger 132a, and may be delivered to the opposite ends of piston 81 through ports 133 or 134 respectively communicating with the different poppet valves 122, 123. When one of the poppet valves is opened by the cams 120 or 121 the leakage of fluid through the open valve causes the floating plunger 132a to move to close off the flow of pressure fluid in the direction of the open valve. Pressure is then operating only on the piston face which is in communication with the closed poppet valve, the other end of the piston being vented through the open valve, and the piston will be forced to move in the direction of the port leading to the open valve. Thus, in the drawings, Fig. 7, the cam 120 has opened the poppet valve 122, resulting in movement of piston 81 to its right-hand position. As has been stated, the piston movements operate to shift the gear unit 60, 61, Fig. 6, to its different speed positions.

The piston device 74, Fig. 7, which effects the alternative positions of the gear unit 55, 56, 57, has three positions. So far as concerns the control of the piston 75 to effect the one or the other of its opposite end positions pressure fluid supplied to the port 125 operates through a floating valve 135 and ports such as 136, 137 in the same manner as for the piston device 80 just previously described. A third central position of the piston 75, shown in Fig. 7, is obtained when cam 114 opens the poppet valve 117 which communicates with a central port 138. When poppet valve 117 is open the action is the same except that the piston moves from the one or the other of its end positions only until the central port 138 is covered, thereby preventing leakage of fluid through the open poppet valve.

The manner of providing pressure fluid to the devices 62, 74, 80 to effect the direct type of speed control now being considered will now be described.

As previously explained, when the valve 110, Fig. 7, is in the position for direct speed control, any rotation of speed selector chart 84a relative to indicator pointer 85 will operate poppet valve 106 to cause the valve plungers 99a, 99b to quickly move downwardly to the full extent of their movement. Following such downward movement, as soon as the selector shaft 90 and cam 105 comes to rest in the required speed position, the poppet valve 106 closes and the pressure fluid from port 103 effects upward movement of valve members 99a, 99b, such upward movement being relatively slow because of the restriction of port 103.

A port 139 in the valve sleeve 99d is continuously supplied with pressure fluid from the channel 96 through an annular groove 140, a channel 141, an annular groove 142, and channels 143, 144. At a certain position during the slow upward movement of valve member 99b pressure fluid from the port 139 is supplied to the port 125 of piston device 74 and simultaneously to the port 126 of piston device 80 through an annular groove 145 and drilled holes 146, 147, 148 in valve member 99b, a port 149 in valve sleeve 99d, and channels 150, 151, from which the fluid reaches the port 125 of piston device 74 through a channel 152 and reaches the port 126 of piston device 80 through the channels 153, 154.

Somewhat later in the upward movement of valve member 99b the same drilled hole 148 of valve member 99b similarly supplies pressure fluid from the port 139 to the port 124 of the piston device 62 through a port 155 and an annular groove 155a in the valve sleeve 99d, and through channels 155b, 155c. Simultaneously with such supply of pressure fluid to port 124 pressure fluid is also supplied to the port 124a of piston device 62 through the drilled hole 147, a drilled hole 148a, a port 156 and an annular groove 156a in the valve sleeve 99d, and through channels 156b, 156c.

The upward movement of valve member 99b is relatively slow, as mentioned, and the pressure ports communicate as described for a sufficient interval that the piston devices 62, 74, 80 are operated to effect the spindle speed indicated on the selector chart, in the manner previously described. It may be noted that although the valve member 99b travels during its downward movement through the same pressure fluid supply positions as just described, but in reversed order, the relatively rapid downward movement does not allow sufficient time for the piston devices 62, 76, 80 to operate. In the upper position of the valve member 99b, as shown in Fig. 7, the fluid pressure from port 139 is cut off.

The pressure fluid supplied to the piston device during upward movement, as just described, shifts the various devices according to the position of the selector device and of the control cams on shaft 90, Fig. 7, and the control cams are arranged to operate the poppet valves in such sequence that, during the direct method of control, one revolution of selector chart 84a relative to indicator 85 effects the various speed changes at substantially equally spaced increments of such relative movement and in their numerical order.

Means are provided to invariably effect slow rotation of the shiftable gear units 55, 56, 57 and 60, 61 during shifting thereof; whereby to avoid abutment of the end faces of the gears, such as might block the shifting. Such slow rotation is effected by providing control means insuring that the primary speed change unit, consisting of the friction clutches 36, 44, occupies its slow speed position, wherein the clutch 44 is engaged and clutch 36 is disengaged, during any shifting of the gear units.

For such result the following mechanism is provided: When the valve elements 99a, 99b approach their downmost position, Fig. 7, and during a portion of the upward movement prior to admitting pressure fluid to the piston devices of the shiftable gear units the fluid pressure port 139 communicates with the port 156 in valve sleeve 99d, and with the port 124a of piston device 62, through the annular groove 145 and drilled holes 146, 147, 148. The fluid pressure thus supplied to the piston device 62 urges piston 63 to the right in Fig. 7 and, at the same time, pressure opposing such movement of piston 63 is relieved, since the valve member position which effects the pressure connection mentioned also effects a drain connection of the port 124 of piston device 62, the drain operating through the channels 155c, 155b, annular groove 155a, port 155, and through the annular space surrounding the relatively small diametered plunger valve member 99a which then stands opposite port 155, the drain fluid passing out of such annular space through a slot 162 in the end of valve sleeve 99d, an annular groove 163 and a drain channel 164.

In various types of machine tools, and particularly in lathes, it is sometimes desirable to alternatively effect a high speed or a relatively low speed by independent control means, that is to say without resetting the normal speed selective mechanism. Such mode of operation will, for convenience, be termed high-low speed control and may be used in a lathe, for example, when the work piece requires a high speed for a turning or drilling operation immediately followed by an operation such as reaming or threading at relatively low speed.

Mechanism is provided for such high-low speed control from a hand lever 165, Figs. 2, 5, 7. The control mechanism will first be described as it operates when the valve 110, Fig. 7, is set for the previously described direct mode of control. The lever 165 is fixed on a shaft 166, upon which is also fixed a cam member 167 having cam portions 167a, 167b, 167c respectively operatively controlling the open or closed positions of poppet valves 168, 169, associated with valve unit 99, and a poppet valve 170 associated with the valve unit 100. The lever 165 and shaft 166 are normally urged by a spring pressed plunger 171, Fig. 3, to a central position in which each of the poppet valves just mentioned are closed, but when lever 165 is shifted downwardly, Fig. 1, the cam portion 167c opens poppet valve 170, thereby draining the pressure fluid from the chamber underneath valve member 100b, Fig. 7, through the open poppet valve and through a drain port 170a, faster than the fluid can enter the chamber through the restricted pressure port 104, whereupon the valve members 100a, 100b immediately move down from the position shown in Fig. 7 to their lowermost positions.

In this lowermost position of the valve members 100a, 100b fluid from the pressure channel 96, Fig. 7, passes to the port 124a of piston device 62, whereby to urge piston 63 to the right in Fig. 7, to effect the slow speed position of the clutches 36, 44 of the primary speed change unit, the pressure fluid passing through the channels 144, 143, the annular groove 142 and a port 173 in the valve sleeve 100d, an annular groove 174 and drilled holes 175, 176, 177 in valve member 100b, another port 178 and annular groove 179 in valve sleeve 100d, a channel 180 and the annular groove 156a, and channels 156b, 156c connected to the port 124a as previously described. At the same time the fluid pressure is drained from the right-hand end of piston 63 through the port 131, a port 181, a channel 182, and a port 183, the port 183 then communicating with a drain port 184 through an annular groove 185 and a port 186 in the valve sleeve 100d, and through the annular channel around the reduced diameter valve member 100a, which effects communication to the drain port when valve member 100b is in its lowest position. The result of the described pressure and drain connection is to force the piston 63 to the right in Fig. 7, whereby to effect the low speed adjustment of the clutches 36, 44 of the primary speed change unit irrespective of the position of the speed selector device previously described.

It will be noted that, following the downward shifting of lever 165 to effect low speed as just described, the lever may be immediately released to return to its central position. Such release permits poppet valve 170 to close and the valve elements 100a, 100b are then returned by fluid pressure to their upper position, Fig. 7 but the clutches 36, 44 remain in their low speed position, since no fluid pressure is then acting on the piston 63.

To effect the high speed in the high-low mode of operation the lever 165 is moved upwardly from the position shown in Fig. 1, the cam portions 167a, 167b, Figs. 5, 7, then operating to open both the poppet valves 168, 169. However, the opening of poppet valve 168 in the present described high-low operation, that is to say while valve 110 is set for the direct type of speed control, is ineffective, since the drain channel for the poppet valve extends from a port 187 through a passage 188 in valve 110, such passage now being closed as shown in Fig. 7, while valve 110 is positioned for the direct method of speed control as previously described. Assuming that the drain from poppet valve 168 is closed, as stated, the opening of poppet valve 169 controls the movement of valve unit 99. The poppet valve 169 drains through a port 189 and an annular groove 190 in the valve sleeve 99d, and through a channel 191 and a drain port 192, and owing to the position of the port 189 the valve members 99a, 99b are forced downwardly, when poppet valve 169 is open, only until the valve member 99b covers the port. The position of the valve member 99b as thus determined is the same as that previously described for the direct control, wherein pressure fluid is supplied from the pressure port 139 of valve sleeve 99d on both the ports 124, 124a of the piston device 62 and, assuming that the rate selector is set for any of the high series of speeds, that is to say any speed for which the cams on shaft 90 are set to effect the high speed position of the clutches 36, 44 of the primary rate change unit, the piston 63 of the piston device 62 will now be immediately shifted to effect such high speed clutch position. Similarly as for the downward operation of lever 165, the lever may be immediately released to return to its central position.

For certain work it is desirable to pre-set the selector chart 84a in advance of the shifting of the rate change units which, during the direct mode of operation previously described, are shifted substantially immediately when the selector device is adjusted. Thus, for example, it might be preferable to preset, during one operation of an operating cycle, the speed or speeds required for the next succeeding operation.

For such preset control the valve 110, Figs. 3, 7, is adjusted to a position closing the passage through channel 109 and valve port 110c and opening the passage 188 through valve port 110d. In this valve position the rotation of the speed selector does not drain the fluid from the bottom, Fig. 7, of valve 99, whereby to effect shifting of the rate change units, because the previously described drain through poppet valve 106 is closed. However, fluid may be drained from the bottom of valve unit 99 whereby to effect the indicated speed at any subsequent time, usually at the beginning of the next operation. To effect this result lever 165 is raised from the position shown in Fig. 1 whereby to open poppet valve 168, which in the present adjustment of valve 110 can now drain through the port 187, channel 188 and port 110d. Raising and then releasing the lever 165 immediately effects the cycle of complete downward and upward movement of valve members 99a, 99b which, as previously explained, shifts the various rate change units to effect the indicated speed.

The previously described high-low operation of the rate changer is available in either the direct or preset setting of the valve 110. In either event the upward movement of lever 165 effects the indicated speed, and the downward movement of lever 165 effects the low speed position of the clutch unit 36, 44, irrespective of the position of the speed selector. Whenever the speed selector occupies a position indicating one of the high series of speeds the lever 165 may be alternatively shifted, at any time, to obtain the indicated high speed or the corresponding speed of the slow series.

However, if the speed indicator is adjusted to indicate one of the low series of speeds the downward movement of lever 165 will not effect a speed change. While such downward lever movement would do no harm it is preferable that it be prevented except when the speed selector is set to effect a high speed on the upward lever movement. Interlock means for effecting this result is shown in Figs. 3, 5. This interlock comprises a member 193 fixed on speed cam shaft 90 and configurated to contact a member 194 fixed on sleeve 167 to prevent downward movement of the high-low control lever 165 whenever the shaft 90 and the selector device are in any position for effecting one of the low series of speeds.

Where a work piece requires a series or cycle of operations requiring different speed indicator positions it is sometimes convenient to pre-indicate such positions and the preferred or necessary sequential order thereof for all steps in the cycle. For such pre-indication there is provided a set of differently marked indicating elements such as spring clips 210, 210a, 210b, Figs. 1, 2, adapted to be interchangeably engaged and retained in various angular positions on the grooved rim, Fig. 1, of the dial 84. As an example, the clip 210, here shown, bears the number 3, corresponding to the third operation of a series, and is positioned to effect the speed selector setting required for such third operation when the selector chart is rotated to bring the clip adjacent to the stationary indicator pointer 85. It will be understood that a set of these clips, as used, includes as many clips as there are speed selector positions in an operation cycle, each clip being differently marked and positioned to indicate the required selector positions and the order of use thereof. By reason of the provision for high-low operation of the rate changer, as previously described, any sequence indicator positioned for pre-indicating one of the high series of speeds also pre-indicates the corresponding speed of the low series, since both such high and low speeds are immediately available in the same setting of the selector.

Means are provided for selecting the rate changer adjustment in accordance with the cutting speed required on the work piece, as follows: The rotative speed chart member 84, Figs. 1, 2, is conical in form and relatively thin, and is fitted adjacently outside a correspondingly conical chart member 220 fixed on a hub portion 220a which is relatively rotatable on the sleeve 87, whereby chart members 84, 220 are also relatively rotatable. An end flange 221 fixed on sleeve 87 provides an aperture or window 221a. The end face of the hub 220a adjacent the flange 221 carries a scale or chart of linear cutting speeds, one of the markings of the chart being shown at 222, the various markings being suitably angularly arranged to be visible one at a time through the window 221a as the member 220 is relatively rotated by a handle 223, and the markings collectively representing the range of cutting speeds desired.

Diameter charts indicating, in this instance, different diameters of work on which the cutting tools may operate, are also provided. These diameter charts cover the range of work diameters for which the machine is adapted and consist of different sets of markings such as 224a, 224b, 224c, 224d each carried on the member 220 and respectively visible through different window openings 225a, 225b, 225c, 225d in the member 84. The arrangement of the cutting speed and diameter charts is such that, as the member 220 is rotated by the handle 223 relative to the hub 87, whereby to expose different cutting speeds through the window 221a, the values on the diameter charts are brought to coincide or align with the values on the rotational speed chart 84a which will effect the indicated cutting speed.

The limitations of machine design are such that, ordinarily, not all the cutting speeds may be obtained for all the diameters listed on the diameter charts, but the window apertures for the diameter charts, as here shown, are positioned to visibly exhibit only those diameters which can be machined by the available spindle speeds at the cutting speed which is simultaneously exhibited.

The described arrangement of charts respectively indicating rotary speed, cutting speed and diameter is useful in a variety of ways. Thus, for example, in any setting of the rotary speed chart 84a relative to pointer 85, if the diameter chart is relatively rotated by the handle 223 to indicate the instant work diameter against the same pointer, the instant cutting speed will be indicated through the window 221a. Also, if the cutting speed chart is rotated for a desired cutting speed to be visible through window 221a, the selector mechanism may be positioned to effect the indicated cutting speed for any of the diameters indicated on the diameter chart, without reference to the chart of rotary spindle speeds, by rotating the selector to indicate the diameter against the pointer 85. Also sequence indicating devices such as the sequentially numbered clips 210 can be arranged in proper position to indicate a sequence of diameters on the diameter chart and the proper rotary speeds to effect the indicated cutting speeds for these various diameters may be obtained in proper sequence, without reference to the chart of rotary spindle speeds, by rotating the selector to bring the clips against the indicator 85 one after another in their numbered order. Various other manners of use will be apparent from these examples.

It will be noted that in all the rate changer shifting operations, by reason of the positioning of the pressure fluid supply ports in the valve units 99, 100, Fig. 7, the pressure fluid on piston devices 62, 74, 80 operates only during movement of the valve members of these valve units. When the valve members are in their upper positions as shown in Fig. 7, all fluid pressure on piston devices 74, 80 is released through a channel 230, a passage 231, a drilled hole 232 in the valve sleeve 99c, and an annular groove 233 in valve member 99a. Pressure fluid to port 124 of piston device 62 is also relieved through a channel 234, a passage 235, a drilled hole 236 in valve sleeve 99c, an annular groove 237 in valve member 99a, drilled hole 238 in sleeve 100c, and an annular groove 239 in valve member 100a. When the piston device 62, Fig. 7, has been shifted its clutch mechanism 36, 44, Fig. 6, is retained in position until the next shifting operation by the locking of the cam surfaces of shifter levers 39, 49 against the lever operating pins. The shiftable gear units are yieldably retained in shifted position by detent notches, such as 240, Fig. 7, associated with their respective piston devices, there being for each gear unit piston device detents such as shown in Fig. 7A each providing opposed plungers such as 241, 242 adapted to enter the notches such as 240, and a spring such as 243 simultaneously yieldably urging the plungers into notch engagement.

What is claimed is:

1. In a machine tool the combination of a transmission including primary rate change means adjustable to relatively high and low speed positions and an adjustable rate change device driven therethrough, said rate change means and device being collectively adjustable into various adjustment position combinations respectively productive of different transmission output rates, a rate selector device movable to a plurality of positions respectively corresponding to different of said position combinations, shifter means for said rate change means and rate change device including a plurality of fluid operable piston devices, and valve means operable from said selector device to control delivery of fluid to said piston devices, said valve means being operative upon movement of said selector device from one to another of its positions to effect adjustment of said primary rate change means to the slow speed position thereof during adjustment of said rate change device to the position required for effecting the position combination corresponding to the selector device position and subsequently to effect an adjustment of said primary rate change means to the position required for effecting the position combination corresponding to the position of said selector device.

2. In a machine tool the combination of a transmission including friction clutch means shiftable to relatively high and low speed positions, shiftable rate change gearing driven through said friction clutch means, said clutch means and gearing being collectively shiftable into various position combinations respectively productive of different transmission output speeds, a selector device movable to a plurality of positions respectively corresponding to different of said position combinations, and shifter means operable to shift said friction clutch means and rate change gearing to effect different of said position combinations in accordance with the different positions of said selector device, said shifter means including means operative to shift said friction clutch means to the low speed position thereof during shifting of said rate change gearing and subsequently to shift said friction clutch means to effect one or the other of said positions thereof in accordance with the position of said selector device.

3. In a machine tool the combination of a transmission including primary rate change means adjustable to relatively high and low speed positions and an adjustable rate change device driven therethrough, said primary rate change means and rate change device being collectively adjustable into various position combinations respectively productive of different transmission output speeds, a rate selector device movable to different adjustment positions respectively corresponding to different of said position combinations, and shifter means controlled by said selector device and operable upon adjustment of said selector device from one to another of its positions to adjust said primary rate change means to said low speed position irrespective of the position of adjustment of said selector device and substantially simultaneously adjust said rate change device in accordance with the adjustment of said selector device and later to adjust said primary rate change means to said high or low speed position in accordance with the adjustment of said selector device.

4. In a machine tool the combination of a transmission including primary rate change means adjustable to relatively high and low speed positions and an adjustable rate change device driven therethrough, said primary rate change means and rate change device being collectively adjustable into various position combinations respectively productive of different transmission output speeds, a rate selector device providing different adjustment positions respectively corresponding to different of said position combinations, a power operable shifter for adjusting said primary rate change means, a power source for said shifter, said selector device controlling the connection of said power source and shifter to effect adjustment of said primary rate change means to said low speed position upon adjustment of said selector from one to another of its positions and subsequently to effect said high or low speed adjustment of said primary rate change means in accordance with said other position of said selector device, and means operative during said low speed position of the primary rate change means effected upon said movement of the selector device from one to another of its positions to adjust said rate change device in accordance with said other position of said selector device.

5. In a transmission and control mechanism the combination of a primary rate change device adjustable to relatively high and low speed positions, other rate change means driven through said primary rate change device and adjustable in the high speed position of the primary device to effect a series of relatively high speeds and in the low speed position thereof to effect a series of relatively low speeds, said high and low series of speeds collectively effecting an extended series of speeds in substantially geometric progression, a first control means for combined adjustment of said primary rate change device and of said other rate change means to selectively effect one or another of said extended series of speeds, and a second control means for adjustment of said primary rate change device independently of said first control means.

6. In a transmission and control mechanism the combination of primary rate change means including a plurality of friction clutches, other rate change means driven through said friction clutches and including gearing shiftable for effecting a series of speeds, said friction clutches being engageable to alternatively effect relatively high and low driving speeds collectively operative with said other rate change means to effect an extended series of speeds, a first controller combinedly controlling the engagement of the friction clutches of said primary rate changer and the shifting of said gearing to selectively effect the one or the other of the speeds of said extended series of speeds, said first controller being operative to engage the friction clutches of said primary rate changer to effect said low driving speed during shifting of said shiftable gearing and subsequently to effect an engagement of said friction clutches determined by the selective position of the controller, and a second controller individually controlling the alternative high or low speed engagement of said friction clutches independently of said first controller.

7. In a transmission and control mechanism the combination of a plurality of rate change devices adjustable to various position combinations collectively effecting a series of different speed ration effects, driving means for said devices including a shiftable interruptor clutch device, a first control device including a speed selector having various adjustment positions respectively corresponding to different of said speed ratio effects together with shifter means for said rate change devices and means for effecting operation of said shifter means controlled in accordance with the adjustment of said selector, and a second control device adjustable to different positions, the last mentioned control device in one of the adjustment positions thereof being operative to effect said selector controlled operation of said shifter means substantially coincident with adjustment of said selector from one to another of its positions and in another of the adjustment positions thereof preventing said substantially coincident operation of said shifter means, each of said control devices being arranged for operation independently of said clutch device and while the device remains in driving position.

8. In a transmission and control mechanism the combination of a plurality of rate change devices adjustable to various position combinations collectively productive of a series of different transmission output speeds including a relatively low speed, a speed selector having various adjustment positions respectively corresponding to different of said speeds, shifter means for said rate change devices, means for operation of said shifter means controlled in accordance with the adjustment of said selector, a control device including means adjustable to different positions respectively operative to effect said selector controlled operation of said shifter means substantially simultaneously with adjustment of said selector from one to another of its positions and operative to prevent said substantially simultaneous operation of said shifter means, and another control device including means adjustable to different positions respectively operative to effect said prevented operation of said shifter means and to operate said shifter means to effect an adjustment of said rate change devices productive of said relatively low speed.

9. In a transmission and control mechanism the combination of a plurality of rate change devices adjustable to various position combinations collectively productive of a series of different transmission output speeds, driving means for said rate change devices including a shiftable interrupter clutch device, a speed selector having various adjustment positions respectively corresponding to different of said speeds, shifter means for said rate change devices including fluid operable piston devices together with a pressure fluid source and valve means controlled in accordance with the adjustment of said selector for effecting various connections of said source and piston devices, a control device including means adjustable to different positions respectively operative to effect the selector controlled connection of said source and piston devices substantially immediately upon adjustment of said selector from one to another of its positions and to prevent said substantially immediate connection, and another control device including a movable member and means operable substantially immediately upon movement of said member to effect said prevented selector controlled connection, said speed selector and control device each being arranged for operation independently of said clutch device and while the device remains in driving position.

10. In a transmission and control mechanism the combination of a plurality of rate change devices adjustable to various position combinations collectively productive of a series of different transmission output speeds, a speed selector having various adjustment positions respectively corresponding to different of said speeds, shifter means for said rate change devices including fluid operable piston devices together with a pressure fluid source and valve means controlled in accordance with the adjustment of said selector for effecting various connections of said source and piston devices, a control device including means adjustable to different positions respectively operative to effect one of said selector controlled connections of said source and piston devices substantially immediately upon adjustment of said selector device from one to another of its positions and to prevent said substantially immediate connection, and another control device including means adjustable to different positions respectively operative to effect said prevented selector controlled connection of said source and piston devices whereby to effect a position combination of rate change devices productive of a speed corresponding to the position of said selector device, and to effect a position combination of said rate change devices productive of a relatively low speed.

11. In a transmission and control mechanism the combination of a plurality of rate change devices including a primary rate change device adjustable to relatively high and low speed positions and another rate change device actuated through the primary device, said devices being collectively adjustable into a variety of position combinations respectively productive of different transmission output speeds, a selector device adjustable into a plurality of positions respectively corresponding to different of said position combinations, and shifter means operable in various positions of said selector device to effect the position combination of said rate change devices corresponding to the selector device position, said shifter means being operable in some of said selector device positions to shift said primary rate change device to said low speed adjustment thereof while said other rate change devices are shifted to a position determined by the selector device adjustment and subsequently to shift said primary rate change device to a position determined by the selector device adjustment.

12. In a transmission and control mechanism the combination of a plurality of rate change devices including a primary rate change device adjustable to relatively high and low speed positions and another rate change device actuated through the primary device, said devices being collectively adjustable into a variety of position combinations respectively productive of different transmission output speeds, a selector device adjustable into a plurality of positions respectively corresponding to different of said position combinations, a controller including a member normally in an ineffective position and shiftable to an effective position, and shifter means operative in said effective position of said controller member to adjust said primary rate change device to said low speed position thereof while adjusting said other rate change devices to the position thereof required for effecting the position combination corresponding to the adjustment position of said selector device and subsequently to adjust said primary rate change device to the position thereof required for effecting the last mentioned position combination, said shifter means in said ineffective position of said controller member being inoperative to effect said last mentioned position combination.

13. In a transmission and control mechanism the combination of a primary rate change device adjustable to relatively high and low speed positions and another rate change device actuated through the primary device, said devices being collectively adjustable into a variety of position combinations respectively productive of different output speeds, a selector device adjustable into various positions respectively corresponding to different of said position combinations, shifter means operable in some of said selector device positions to shift said primary rate change device to effect said low speed position thereof while said other rate change device is shifted to the adjustment thereof required for effecting the position combination corresponding to the position of said selector device and subsequently to shift said primary rate change device to the position thereof required for effecting the last mentioned position combination, and a controller including a member movable between high speed and low speed positions respectively operative to effect adjustment of said primary rate change device to said high and to said low speed positions thereof independently of operation of said selector device.

14. In a transmission and control mechanism the combination of a primary rate change device adjustable to relatively high and low speed positions and another rate change device actuated through the primary device, said devices being collectively adjustable into a variety of position combinations respectively productive of different output speeds, a selector device adjustable into a plurality of positions respectively corresponding to different of said position combinations, a controller having direct and preset adjustment positions, shifter means directly effective in said direct controller position following adjustment of the selector device from one to another of its positions to adjust the primary rate change device to effect said slow speed position thereof while adjusting said other rate change device to the position thereof required for effecting the position combination corresponding to the position of said selector device and subsequently to adjust said primary rate change device to the position thereof required for effecting the last mentioned position combination, said controller in said preset adjustment position being operative to delay said directly effective operation of said shifter means, and another controller having a normal and an effective adjustment position, said other controller in said normal position being operative to continue said delay in operation of the shifter means and in said effective position being operative to effect said delayed shifter means operation whereby to effect said last mentioned position combination.

15. A transmission and control mechanism as recited in claim 14 in which the other controller is adjustable to another position, and including means operative in said other position to effect adjustment of the primary rate change device to the low speed position thereof independently of the selector device.

16. In a transmission and control mechanism the combination of a plurality of rate change devices each adjustable to effect different device output speeds and combinedly adjustable for effecting various adjustment combinations collectively effecting a relatively low transmission output speed and a plurality of different relatively high transmission output speeds, a selector device having various adjustment positions respectively corresponding to different of said adjustment combinations effecting the relatively high transmission output speeds, shifter means operable for effecting any of said adjustment combinations, and a controller adjustable independently of said selector device to a high speed and a low speed position, said controller when moved to the high speed position thereof effecting operation of said shifter means to effect the relatively high transmission output speed corresponding to the adjustment position of said selector device, said controller when moved to the low speed position thereof effecting operation of said shifter means to effect said relatively low transmission output speed.

17. In a transmission and control mechanism the combination of a plurality of rate change devices each adjustable to effect different device output speeds and combinedly adjustable for effecting various adjustment combinations collectively effecting a relatively low transmission output speed and a plurality of different relatively high transmission output speeds, a selector device having various adjustment positions respectively corresponding to different of said adjustment combinations, shifter means operable for effecting said adjustment combinations, a controller device adjustable to a first position operable substantially coincident with such adjustment to effect operation of said shifter means to effect the adjustment combination corresponding to the position of the selector device, said controller device being adjustable to a second position delaying said substantially coincident operation of said shifter means, and control means adjustable to effect operation of said shifter means to independently alternatively adjust one of said rate change devices to the adjustment required for the adjustment combination corresponding to the position of the selector device, or to adjust the last mentioned rate change device to the position required for the adjustment combination of said relatively low transmission output speed.

18. In a transmission and control mechanism the combination of a plurality of rate change devices combinedly adjustable to various adjustment combinations collectively effecting a relatively low transmission output speed and a plurality of relatively high transmission output speeds, a selector device having various adjustment positions respectively corresponding to different of said output speeds, shifter means for adjusting said rate change devices for effecting various of said adjustment combinations, and a control device including a portion adjustable to different positions one of which operates substantially coincident with adjustment of said selector device from one to another of its positions to operate said shifter means to effect the adjustment combination of said rate change devices corresponding to said other selector device position, the other position of said control device portion operating to delay said substantially coincident shifter operation, said control device having another portion independently adjustable to effect said delayed shifter operation, said control device including means operative both in said substantially coincident shifter means operation and in said delayed shifter means operation to effect operation of said shifter means to initially adjust some of said rate change devices to the position thereof required for effecting said relatively low transmission output speed and subsequently to effect operation of said shifter means to adjust said rate change devices to effect the position combination corresponding to said other selector device position.

19. In a transmission and control mechanism the combination of a plurality of rate change devices combinedly adjustable to various adjustment combinations collectively effecting a relatively low transmission output speed and a plurality of relatively high transmission output speeds, a selector device having various adjustment positions respectively corresponding to different of said output speeds, shifter means for adjusting said rate change devices for effecting various of said adjustment combinations, a control device including a portion adjustable to different positions one of which operates substantially coincident with adjustment of said selector device from one to another of its positions to operate said shifter means to effect the adjustment combination of said rate change devices corresponding to said other selector device position, the other position of said control device portion operating to delay said substantially coincident shifter operation, said control device having another portion independently adjustable to effect said delayed shifter operation, said control device including means operative both in said substantially coincident shifter means operation and in said delayer shifter means operation to effect operation of said shifter means to initially adjust some of said rate change devices to the position thereof required for effecting said relatively low transmission output speed and subsequently to effect operation of said shifter means to adjust said rate change devices to effect the position combination corresponding to said other selector device position, and other control means operable to effect operation of said shifter means for alternatively adjusting said rate changers to the position combination effecting said relatively low output speed or to the position combination effecting one of said relatively high output speeds corresponding to the position of the selector device.

20. In a transmission and control mechanism the combination of a plurality of rate change devices combinedly adjustable to various position combinations collectively effecting a relatively low transmission output speed and a plurality of different relatively high transmission speeds, a selector device adjustable into a plurality of positions respectively corresponding to different of said position combinations, said selector device providing position sequence determining means including a series of markings indicative of a preferred order of a selected plurality of said selector device adjustment positions and indicator means movable relative to said markings to effect said selected plurality of positions in said order, shifter means for adjusting said rate change devices for effecting various of said position combinations, and a control device including a portion adjustable to different positions one of which operations substantially coincident with the adjustment of said selector device from one to another of said selected plurality of positions to operate said shifter means to effect the position combination of said rate change devices corresponding to said other position of the selector device, another position of said control device portion operating to delay said substantially coincident shifter means operation, said control device including another portion adjustable to a normal position continuing said delay in shifter operation and alternatively adjustable to an effective position terminating said delay whereby to then effect the rate change device adjustment combination corresponding to said other position of the selector device.

21. In a transmission and control mechanism the combination of a plurality of rate change devices adjustable into various adjustment combinations combinedly effecting a low output speed and a plurality of relatively high output speeds, a selector device having various adjustment positions respectively corresponding to different of said adjustment combinations, shifter means for adjustment of said rate change devices, and a controller adjustable to different positions one of which substantially coincident with adjustment of the controller thereto effects operation of said shifter means to first adjust one of said rate change devices to the adjustment thereof required for the adjustment combination effecting said low output speed while other of said rate change devices are being adjusted for the adjustment combination corresponding to the position of said selector device, and subsequently adjusting said one of the rate change devices to the adjustment required for the adjustment combination corresponding to the position of said selector device, said controller in another adjustment position thereof delaying said substantially coincident operation of the shifter means.

22. A transmission and control mechanism as recited in claim 21 including control means adjustable to effect operation of said shifter means to independently alternatively adjust one of the rate change devices to its adjustment required for the adjustment combination corresponding to the position of the selector device, or to adjust the last mentioned rate change device to the adjustment required for the adjustment combination of said low output speed.

23. In a transmission and control mechanism the combination of a drive device having motion interrupting and driving adjustments, a plurality of rate change devices driven through said driving device and collectively adjustable into various adjustment combinations combinedly effecting a plurality of transmission output speeds, a selector device having various adjustment positions respectively corresponding to different of said adjustment combinations, shifter means for said rate change devices, a controller device adjustable to a first adjustment operable substantially coincident with such adjustment to effect operation of said shifter means for effecting the adjustment combination corresponding to the position of said selector device, said controller device being adjustable to a second adjustment delaying said substantially coincident shifter means operation, said selector device and controller device each being arranged for operation independently of the adjustment position of said drive device, and while the drive device remains in driving position.

24. In a transmission and control mechanism the combination of a driver device having forward and reverse driving adjustments and a drive interrupting adjustment, a plurality of rate change devices driven through said driver device and collectively adjustable into various adjustment combinations combinedly effecting a plurality of transmission output speeds, a selector device having various adjustment positions respectively corresponding to different of said adjustment combinations, shifter means for said rate change devices, a controller device adjustable to a first adjustment operable substantially coincident with such adjustment to effect an operation of said shifter means productive of the adjustment combination of said rate change devices corresponding to the position of said selector device, said controller device being adjustable to a second adjustment position delaying said substantially coincident shifter means operation, said selector device and controller device each being arranged for operation independently of the adjustment position of said driver device and while the driver device is in either forward or reverse driving position.

25. In a transmission and control mechanism the combination of a plurality of rate change devices including a primary rate change device adjustable to relatively high and low speed positions and another rate change device actuated through the primary device, said devices being collectively adjustable into a variety of position combinations respectively productive of different transmission output speeds, a selector device adjustable into a plurality of positions respectively corresponding to different of said position combinations, shifter means operable in various positions of said selector device to effect the position combination of said rate change devices corresponding to the selector device position, said shifter means being operable in some of said selector device positions to shift said primary rate change device to said low speed adjustment thereof while said other rate change devices are shifted to a position determined by the selector device adjustment and subsequently to shift said primary rate change device to a position determined by the selector device adjustment, and supplemental selector means associated with said selector device including means adjustable for selectively indicating various preferred sequences of adjustment of said selector device.

26. In a machine tool transmission and control mechanism the combination of a plurality of rate change devices including a primary rate change device adjustable to relatively high and low speed positions and another rate change device actuated through the primary device, said devices being collectively adjustable into a variety of position combinations respectively productive of different transmission output speeds, a selector device adjustable into a plurality of positions respectively corresponding to different of said position combinations, shifter means operable in various positions of said selector device to effect the position combination of said rate change devices corresponding to the selector device position, said shifter means being operable in some of said selector device positions to shift said primary rate change device to said low speed adjustment thereof while said other rate change devices are shifted to a position determined by the selector device adjustment and subsequently to shift said primary rate change device to a position determined by the selector device adjustment, said selector device including means for indicating a plurality of cutting speeds for each of a plurality of different diameters and means visually determinative of diffferent of said selector device adjustment positions in accordance with said indicating means.

27. In a transmission and control mechanism the combination of a plurality of rate change devices each adjustable to effect different device output speeds and combinedly adjustable for effecting various adjustment combinations collectively effecting a relatively low transmission output speed and a plurality of different relatively high transmission output speeds, a selector device having various adjustment positions respectively corresponding to different of said adjustment combinations effecting the relatively high transmission output speeds, shifter means operable for effecting any of said adjustment combinations, a controller adjustable independently of said selector device to a high speed and a low speed position, said controller when moved to the high speed position thereof effecting operation of said shifter means to effect the relatively high transmission output speed corresponding to the adjustment position of said selector device, said controller when moved to the low speed position thereof effecting operation of said shifter means to effect said relatively low transmission output speed, and supplemental selector means associated with said selector device including means adjustable for selectively indicating various preferred sequences of adjustment of said selector device.

28. In a machine tool transmission and control mechanism the combination of a plurality of rate change devices each adjustable to effect different device output speeds and combinedly adjustable for effecting various adjustment combinations collectively effecting a relatively low transmission output speed and a plurality of different relatively high transmission output speeds, a selector device having various adjustment positions respectively corresponding to different of said adjustment combinations effecting the relatively high transmission output speeds, shifter means operable for effecting any of said adjustment combinations, a controller adjustable independently of said selector device to a high speed and a low speed position, said controller when moved to the high speed position thereof effecting operation of said shifter means to effect the relatively high transmission output speed corresponding to the adjustment position of said selector device, said controller when moved to the low speed position thereof effecting operation of said shifter means to effect said relatively low transmission output speed, said selector device including means for indicating a plurality of cutting speeds for each of a plurality of different diameters and means visually determinative of different of said selector device adjustment positions in accordance with said indicating means.

29. The combination with a transmission including a plurality of rate change devices collectively adjustable to effect a plurality of transmission output speeds in substantially geometrical progression including a plurality of high speeds and a plurality of relatively low speeds, of control means adjustable for adjustment of said rate change devices to selectively effect one or another of said output speeds, another control means operable independently of the first mentioned control means for adjustment of at least some of said rate change devices to alternatively effect one of said high or low transmission output speeds, and interlock means preventing operation of the independently operable control means in some of the positions of adjustment of the other control means.

GEORGE H. JOHNSON.